(12) United States Patent
Matuszewski (10) Patent No.: US 8,239,550 B2
(45) Date of Patent: Aug. 7, 2012

(54) METHODS, APPARATUSES, AND COMPUTER PROGRAM PRODUCTS FOR FACILITATING ESTABLISHING A COMMUNICATIONS SESSION

(75) Inventor: Marcin Wieslaw Matuszewski, Espoo (FI)

(73) Assignee: Nokia Corporation, Espoo (FI)

( * ) Notice: Subject to any disclaimer, the term of this patent is extended or adjusted under 35 U.S.C. 154(b) by 369 days.

(21) Appl. No.: 12/152,376

(22) Filed: May 14, 2008

(65) Prior Publication Data

US 2009/0287829 A1    Nov. 19, 2009

(51) Int. Cl.
    *G06F 15/16*    (2006.01)
(52) U.S. Cl. .................. 709/228; 709/227; 709/245
(58) Field of Classification Search .................. 709/245, 709/227–228
    See application file for complete search history.

(56) References Cited

U.S. PATENT DOCUMENTS

| | | | | |
|---|---|---|---|---|
| 2003/0084162 | A1* | 5/2003 | Johnson et al. | 709/227 |
| 2003/0154306 | A1* | 8/2003 | Perry | 709/245 |
| 2004/0100976 | A1* | 5/2004 | Chang et al. | 370/401 |
| 2005/0152270 | A1* | 7/2005 | Gomez Paredes et al. | 370/229 |
| 2005/0223095 | A1 | 10/2005 | Volz et al. | |
| 2005/0259637 | A1* | 11/2005 | Chu et al. | 370/352 |
| 2006/0229092 | A1* | 10/2006 | Jia et al. | 455/517 |
| 2007/0076729 | A1* | 4/2007 | Takeda | 370/401 |
| 2007/0160034 | A1* | 7/2007 | Koretsky | 370/352 |
| 2007/0195807 | A1* | 8/2007 | Collins et al. | 370/401 |
| 2008/0062978 | A1 | 3/2008 | Hwang et al. | |
| 2008/0259942 | A1* | 10/2008 | Skog et al. | 370/401 |
| 2008/0270626 | A1* | 10/2008 | Takeda et al. | 709/238 |
| 2010/0005288 | A1* | 1/2010 | Rao et al. | 713/151 |
| 2010/0312901 | A1* | 12/2010 | Noyranen et al. | 709/228 |

FOREIGN PATENT DOCUMENTS

EP    1 793 533 A1    6/2007

OTHER PUBLICATIONS

Author unknown; *Prior Art Network System*; dated at least as early as May 12, 2008.

* cited by examiner

*Primary Examiner* — Abdullahi Salad
(74) *Attorney, Agent, or Firm* — Alston & Bird LLP (57) ABSTRACT

An apparatus may include a processor configured to maintain at least a portion of a distributed database. The distributed database may comprise a plurality of private address data. The processor may be further configured to receive a request from a first terminal device seeking to establish a communications session with a second terminal device. The processor may be additionally configured to search the distributed database for a private address for the second terminal device. The processor may also be configured instruct a network address translating (NAT) apparatus to create a binding between the private address for the second terminal device and a public address accessible by the first terminal device. In some embodiments, the processor may be further configured to facilitate establishing a communications session between the first and second terminal devices based upon the binding between the private address and the public address.

25 Claims, 5 Drawing Sheets

METHODS, APPARATUSES, AND COMPUTER PROGRAM PRODUCTS FOR FACILITATING ESTABLISHING A COMMUNICATIONS SESSION

TECHNOLOGICAL FIELD

Embodiments of the present invention relate generally to mobile communication technology and, more particularly, relate to methods, apparatuses, and computer program products for facilitating establishing a communications session.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to further improve the convenience to users is the internetworking of two operator networks, such as may occur when a first terminal device initiates a communication session with a second terminal device residing on a different operator network. Such a communication initiation may occur, for example, during use of voice over internet protocol (VoIP). In this regard, for example, a first terminal device may reside on a local operator network and a second terminal device may reside on a remote operator network. The first terminal device may have an assigned private internet protocol (IP) address within the local operator network which devices residing on the local operator network may use to initiate communications with the first terminal device. However, the second terminal device may not directly initiate communications with the first terminal device using the private IP address. Instead, a network address translation (NAT) must temporarily bind the first terminal device's private IP address with a public IP address accessible by the second terminal device so that the second terminal device may initiate communications with the first terminal device.

In prior networks, the local operator network may use one or more session initiation protocol (SIP) proxy devices as communication intermediaries to receive queries from the second terminal device for the address of the first terminal device. In this regard, the SIP proxy device may query a peer-to-peer session initiation protocol (P2PSIP) network containing private IP address data in a distributed database, such as, for example, a distributed hash table (DHT), for terminal devices on the local operator network for the private IP address assigned to the first terminal device. The P2PSIP network is comprised of a plurality of peer nodes that are assigned private IP addresses and thus are not transparent to the second terminal device. The proxy device may then create a binding at a NAT of the local operator between the private IP address and a public IP address accessible by the second terminal device and provide the public IP address to the second terminal device so that the second terminal device may initiate communications with the first terminal device.

In such prior networks, the SIP proxy devices and NATs may become bottlenecks as all communication requests must be routed through them rather than through the peer nodes of the P2PSIP network. It may be desirable to eliminate this bottleneck. Accordingly, it may be advantageous to provide computing device users with methods, apparatuses, and computer program products for facilitating establishing a communications session.

BRIEF SUMMARY

A method, apparatus, and computer program product are therefore provided to provide for facilitating establishing a communications session. The method, apparatus, and computer program product may use P2P algorithms, such as, for example, P2PSIP, and distributed database protocols, such as a DHT. In particular, a method, apparatus, and computer program product are provided to enhance the establishment of communications sessions between a remote terminal device residing on a remote network and a local terminal device residing on a local operator network. In this regard, P2PSIP nodes may be assigned public addresses accessible by the remote terminal device and be configured to retrieve the local terminal device's private address in response to a query from the remote terminal device, initiate the binding of the private address to a public address at the NAT, and facilitate communication between the remote terminal device and the local terminal device, such as by providing the bound public address to the remote terminal device so that the remote terminal device may directly communicate with the local terminal device. Embodiments of the invention may accordingly be used to enhance the establishment of internetwork communications sessions between terminal devices and in some embodiments may be used to enhance the establishment of VoIP or any other peer-to-peer communications sessions between terminal devices.

In one example embodiment, a method is provided which may include maintaining at least a portion of a distributed database The distributed database may comprise a plurality of private address data. The method may further include receiving a request from a first terminal device seeking to establish a communications session with a second terminal device. The method may additionally include searching the distributed database for a private address for the second terminal device. The method may also include instructing a network address translating (NAT) apparatus to create a binding between the private address for the second terminal device and a public address accessible by the first terminal device.

In another example embodiment, a computer program product is provided. The computer program product includes at least one computer-readable storage medium having computer-readable program code portions stored therein. The computer-readable program code portions include first, second, third, and fourth program code portions. The first program code portion is for maintaining at least a portion of a distributed database, wherein the distributed database comprises a plurality of private address data. The second program code portion is for receiving a request from a first terminal device seeking to establish a communications session with a second terminal device. The third program code portion is for searching the distributed database for a private address for the second terminal device. The fourth program code portion is for instructing a NAT apparatus to create a binding between the private address for the second terminal device and a public address accessible by the first terminal device.

In another example embodiment, an apparatus is provided, which may include a processor. The processor may be configured to maintain at least a portion of a distributed database. The distributed database may comprise a plurality of private address data. The processor may be further configured to receive a request from a first terminal device seeking to establish a communications session with a second terminal device. The processor may be additionally configured to search the distributed database for a private address for the second terminal device. The processor may also be configured to instruct a NAT apparatus to create a binding between the private address for the second terminal device and a public address accessible by the first terminal device.

In another example embodiment, an apparatus is provided. The apparatus may include means for maintaining at least a portion of a distributed database, wherein the distributed database comprises a plurality of private address data. The apparatus may further include means for receiving a request from a first terminal device seeking to establish a communications session with a second terminal device. The apparatus may additionally include means for searching the distributed database for a private address for the second terminal device. The apparatus may also include means for instructing a NAT apparatus to create a binding between the private address for the second terminal device and a public address accessible by the first terminal device.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
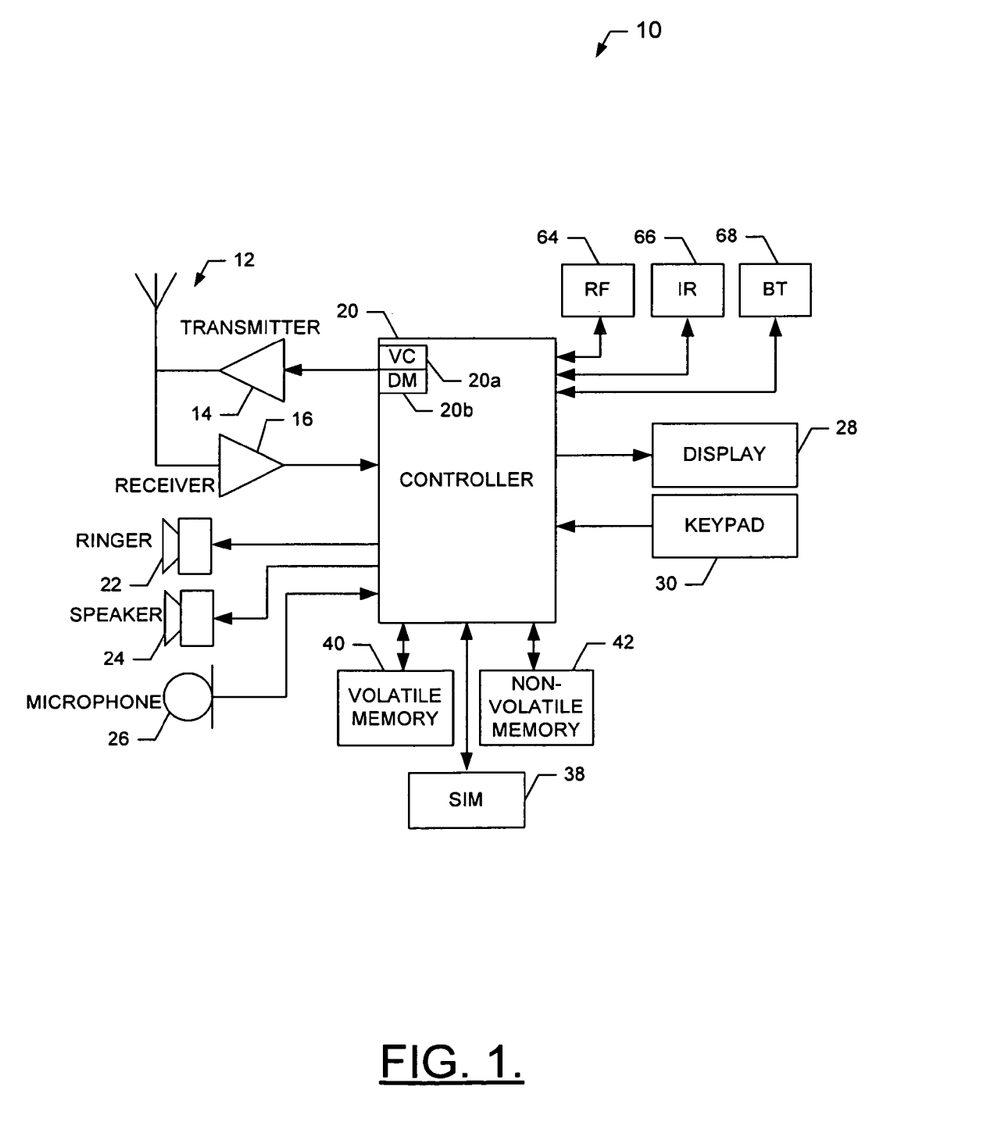
FIG. 1 is a schematic block diagram of a mobile terminal according to an example embodiment of the present invention.

FIG. 1 illustrates a block diagram of a mobile terminal 10 that may benefit from embodiments of the present invention. It should be understood, however, that the mobile terminal illustrated and hereinafter described is merely illustrative of one type of electronic device that may benefit from embodiments of the present invention and, therefore, should not be taken to limit the scope of the present invention. While several embodiments of the electronic device are illustrated and will be hereinafter described for purposes of example, other types of electronic devices, such as portable digital assistants (PDAs), pagers, laptop computers, desktop computers, gaming devices, televisions, and other types of electronic systems, may employ embodiments of the present invention.

As shown, the mobile terminal 10 may include an antenna 12 in communication with a transmitter 14 and a receiver 16. The mobile terminal may also include a controller 20 or other processor that provides signals to and receives signals from the transmitter and receiver, respectively. These signals may include signaling information in accordance with an air interface standard of an applicable cellular system, and/or any number of different wireless networking techniques, comprising but not limited to Wireless-Fidelity (Wi-Fi), wireless LAN (WLAN) techniques such as IEEE 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (TDMA), GSM, and IS-95 (CDMA). Also, for example, the mobile terminal may be capable of operating in accordance with 2.5G wireless communication protocols GPRS, EDGE, or the like. Further, for example, the mobile terminal may be capable of operating in accordance with 3G wireless communication protocols such as UMTS, CDMA2000, WCDMA and TD-SCDMA. The mobile terminal may be additionally capable of operating in accordance with 3.9G wireless communication protocols such as LTE or E-UTRAN. Additionally, for example, the mobile terminal may be capable of operating in accordance with fourth-generation (4G) wireless communication protocols or the like as well as similar wireless communication protocols that may be developed in the future.

Some NAMPS, as well as TACS, mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) protocols.

It is understood that the controller 20 may comprise the circuitry required for implementing audio and logic functions of the mobile terminal 10. For example, the controller 20 may be a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a Web browser. The connectivity program may allow the mobile terminal 10 to transmit and receive Web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive Web content across Internet 50.

The mobile terminal 10 may also comprise a user interface including a conventional earphone or speaker 24, a ringer 22, a microphone 26, a display 28, a user input interface, and/or the like, which may be coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise conventional numeric (0-9) and related keys (#, *), and/or other keys for operating the mobile terminal.

As shown in FIG. 1, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example an infrared (IR) transceiver 66, a Bluetooth™ (BT) transceiver 68 operating using Bluetooth™ brand wireless technology developed by the Bluetooth™ Special Interest Group, and/or the like. The Bluetooth transceiver 68 may be capable of operating according to Wibree™ radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. In this regard, the mobile terminal may comprise volatile memory 40, such as volatile Random Access Memory (RAM), which may comprise a cache area for temporary storage of data. The mobile terminal may comprise other non-volatile memory 42, which may be embedded and/or may be removable. The non-volatile memory may comprise an EEPROM, flash memory, and/or the like. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 2:
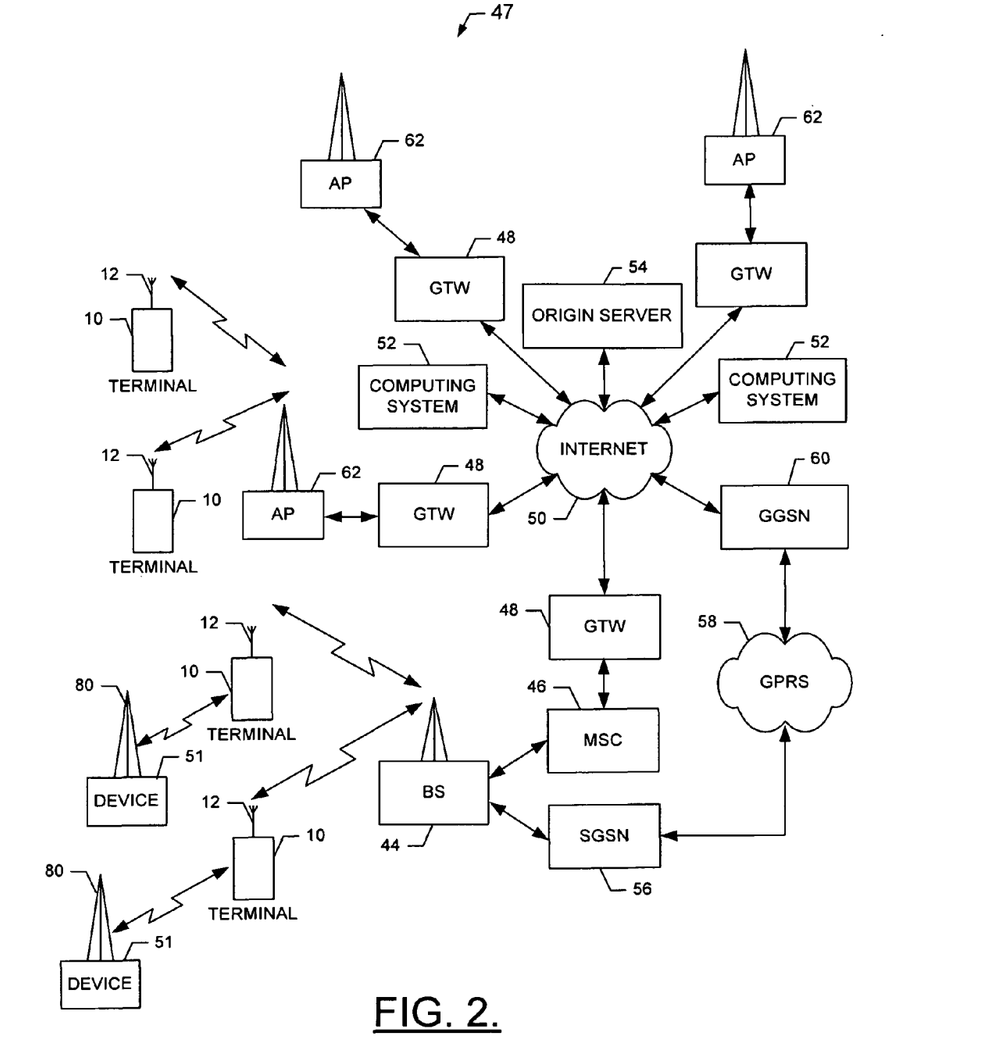
FIG. 2 is a schematic block diagram of a wireless communications system according to an example embodiment of the present invention.

Referring now to FIG. 2, an illustration of one type of system that could support communications to and from an electronic device, such as the mobile terminal of FIG. 1, is provided by way of example, but not of limitation. As shown, one or more mobile terminals 10 may each include an antenna 12 for transmitting signals to and for receiving signals from a base site or base station (BS) 44. The base station 44 may be a part of one or more cellular or mobile networks each of which may comprise elements required to operate the network, such as a mobile switching center (MSC) 46. As well known to those skilled in the art, the mobile network may also be referred to as a Base Station/MSC/Interworking function (BMI). In operation, the MSC 46 may be capable of routing calls to and from the mobile terminal 10 when the mobile terminal 10 is making and receiving calls. The MSC 46 may also provide a connection to landline trunks when the mobile terminal 10 is involved in a call. In addition, the MSC 46 may be capable of controlling the forwarding of messages to and from the mobile terminal 10, and may also control the forwarding of messages for the mobile terminal 10 to and from a messaging center. It should be noted that although the MSC 46 is shown in the system of FIG. 2, the MSC 46 is merely an example network device and the present invention is not limited to use in a network employing an MSC.

The MSC 46 may be coupled to a data network, such as a local area network (LAN), a metropolitan area network (MAN), and/or a wide area network (WAN). The MSC 46 may be directly coupled to the data network. In one typical embodiment, however, the MSC 46 may be coupled to a GTW 48, and the GTW 48 may be coupled to a WAN, such as the Internet 50. In turn, devices such as processing elements (e.g., personal computers, server computers or the like) may be coupled to the mobile terminal 10 via the Internet 50. For example, as explained below, the processing elements may include one or more processing elements associated with a computing system 52 (two shown in FIG. 2), origin server 54 (one shown in FIG. 2) or the like, as described below.

As shown in FIG. 2, the BS 44 may also be coupled to a signaling GPRS (General Packet Radio Service) support node (SGSN) 56. As known to those skilled in the art, the SGSN 56 may be capable of performing functions similar to the MSC 46 for packet switched services. The SGSN 56, like the MSC 46, may be coupled to a data network, such as the Internet 50. The SGSN 56 may be directly coupled to the data network. Alternatively, the SGSN 56 may be coupled to a packet-switched core network, such as a GPRS core network 58. The packet-switched core network may then be coupled to another GTW 48, such as a GTW GPRS support node (GGSN) 60, and the GGSN 60 may be coupled to the Internet 50. In addition to the GGSN 60, the packet-switched core network may also be coupled to a GTW 48. Also, the GGSN 60 may be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown in FIG. 2 and described herein, it should be appreciated that electronic devices, such as the mobile terminal 10, may be coupled to one or more of any of a number of different networks through the BS 44. In this regard, the network(s) may be capable of supporting communication in accordance with any one or more of a number of first-generation (1G), second-generation (2G), 2.5G, third-generation (3G), fourth generation (4G) and/or future mobile communication protocols or the like. For example, one or more of the network(s) may be capable of supporting communication in accordance with 2G wireless communication protocols IS-136 (TDMA), GSM, and IS-95 (CDMA). Also, for example, one or more of the network(s) may be capable of supporting communication in accordance with 2.5G wireless communication protocols GPRS, Enhanced Data GSM Environment (EDGE), or the like. Further, for example, one or more of the network(s) may be capable of supporting communication in accordance with 3G wireless communication protocols such as E-UTRAN or a Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile terminals (e.g., digital/analog or TDMA/CDMA/analog phones).

As depicted in FIG. 2, the mobile terminal 10 may further be coupled to one or more wireless access points (APs) 62. The APs 62 may comprise access points configured to communicate with the mobile terminal 10 in accordance with techniques such as, for example, radio frequency (RF), Bluetooth™ (BT), infrared (IrDA) or any of a number of different wireless networking techniques, including wireless LAN (WLAN) techniques such as IEEE 802.11 (e.g., 802.11a, 802.11b, 802.11g, 802.11n, etc.), Wibree™ techniques, WiMAX techniques such as IEEE 802.16, Wireless-Fidelity (Wi-Fi) techniques and/or ultra wideband (UWB) techniques such as IEEE 802.15 or the like. The APs 62 may be coupled to the Internet 50. Like with the MSC 46, the APs 62 may be directly coupled to the Internet 50. In one embodiment, however, the APs 62 may be indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 may communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 and/or origin server 54 across the Internet 50, the mobile terminal 10, computing system 52 and origin server 54 may be coupled to one another and communicate in accordance with, for example, RF, BT, IrDA or any of a number of different wireline or wireless communication techniques, including LAN, WLAN, WiMAX, Wireless Fidelity (Wi-Fi), Wibree™ and/or UWB techniques. One or more of the computing systems 52 may additionally, or alternatively, include a removable memory capable of storing content, which can thereafter be transferred to the mobile terminal 10. Further, the mobile terminal 10 may be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, Wibree™, Wi-Fi, WLAN, WiMAX and/or UWB techniques. In this regard, the mobile terminal 10 may be capable of communicating with other devices via short-range communication techniques. For instance, the mobile terminal 10 may be in wireless short-range communication with one or more devices 51 that are equipped with a short-range communication transceiver 80. The electronic devices 51 may comprise any of a number of different devices and transponders capable of transmitting and/or receiving data in accordance with any of a number of different short-range communication techniques including but not limited to Bluetooth™, RFID, IR, WLAN, Infrared Data Association (IrDA) or the like. The electronic device 51 may include any of a number of different mobile or stationary devices, including other mobile terminals, wireless accessories, appliances, portable digital assistants (PDAs), pagers, laptop computers, motion sensors, light switches and other types of electronic devices.

Figure 3:
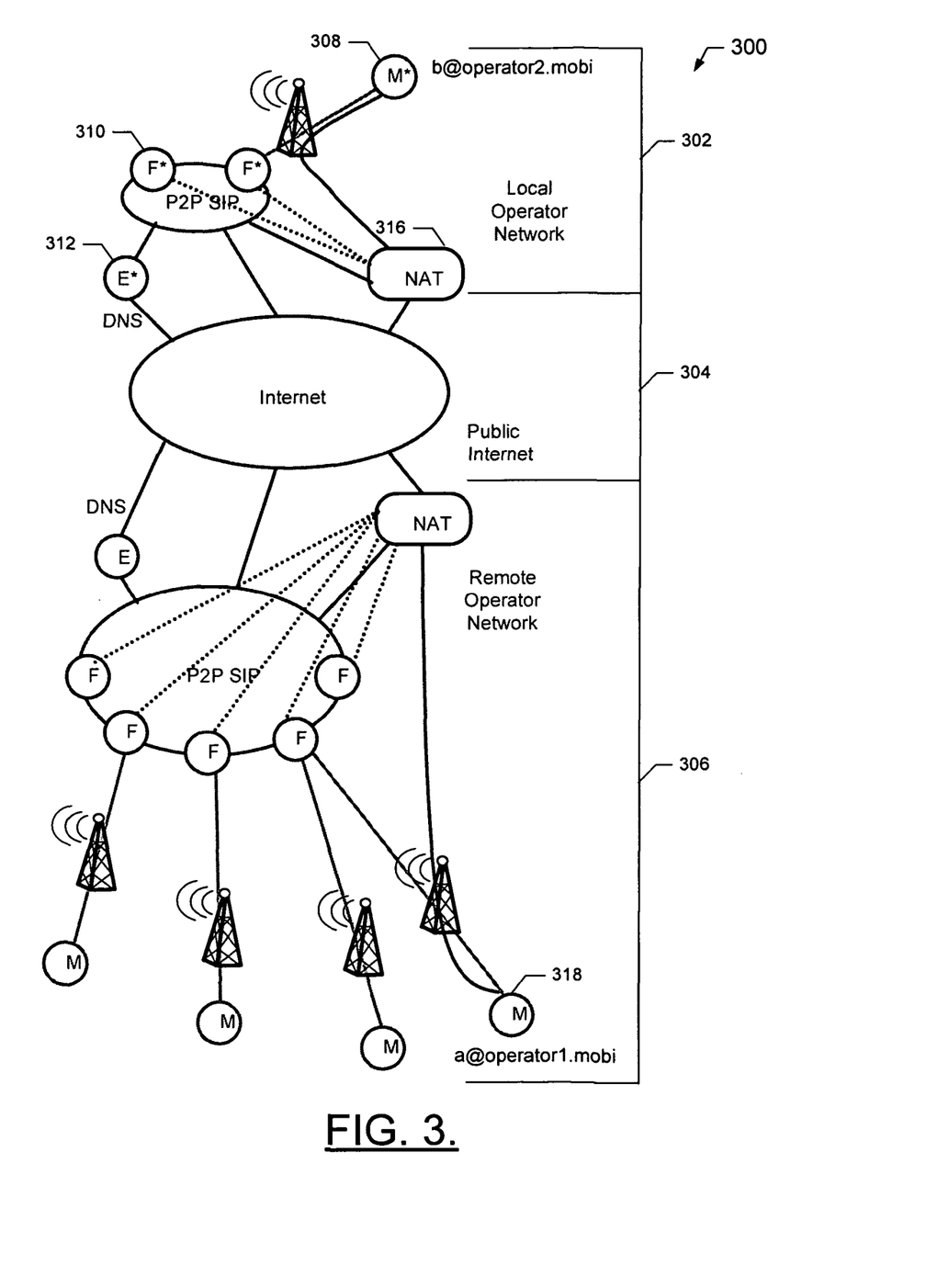
FIG. 3 illustrates a system for facilitating establishing a communications session using P2PSIP and DHT according to an example embodiment of the present invention.

FIG. 3 illustrates a system 300 for facilitating establishing a communications session using P2PSIP and DHT according to an example embodiment of the present invention. As used herein, "example" merely means an example and as such represents one example embodiment for the invention and should not be construed to narrow the scope or spirit of the invention in any way. It will be appreciated that the scope of the invention encompasses many potential embodiments in addition to those illustrated and described herein. The system 300 will be described, for purposes of example, in connection with the mobile terminal 10 of FIG. 1 and the system 47 of FIG. 2. However, it should be noted that the system of FIG. 3, may also be employed in connection with a variety of other devices, both mobile and fixed, and therefore, embodiments of the present invention should not be limited to application on devices such as the mobile terminal 10 of FIG. 1. Further, it should be noted that the system of FIG. 3 may be used in connection with any of a variety of network configurations or protocols and is not limited to embodiments using aspects of the system 47 of FIG. 2. It should also be noted, that while FIG. 3 illustrates one example of a configuration of a system for facilitating establishing a communications session using P2PSIP and DHT, numerous other configurations may also be used to implement embodiments of the present invention. Additionally, although embodiments of the invention will be discussed in connection with the use of DHT, other distributed database protocols may be used as well. Thus, it will be appreciated that discussion of DHT is merely for purposes of example and is not intended to limit embodiments of the invention in any way. Further, P2PSIP is discussed herein merely as an example and other peer-to-peer or non-peer-to-peer structures, algorithms, and/or protocols capable of facilitating communications session initiation may be substituted.

Referring now to FIG. 3, the system 300 may comprise a local operator network (LON) 302, remote operator network (RON) 306, and a network linking the LON 302 and RON 306. The LON 302 and RON 306 may be embodied as and/or comprise elements of the network of the system 47. However, embodiments of the invention are not limited to embodiments where the LON 302 and RON 306 comprise cellular or radio access networks and accordingly the LON 302 and RON 306 may comprise wireless networks, wireline networks, or a combination thereof. The linking network, may, for example, be a public Internet 304 as illustrated in FIG. 3. It will be appreciated, however, that embodiments of the invention are not limited to communication over the Internet and any network may serve as an intermediate linking network between the LON 302 and RON 306. Alternatively, in some embodiments, the LON 302 and RON 306 may be directly linked without an intermediate linking network. It will further be appreciated that while the system 300 illustrates the RON 306 as including a P2PSIP network, embodiments of the invention are not so limited and in some embodiments the RON 306 may not comprise a P2PSIP network.

The LON 302 may comprise a plurality of P2PSIP client devices, such as the local terminal device 308 (denoted "M*"), which may be assigned a private address. The private address may be used to by other devices on the LON 302 to communicate with the local terminal device 308. However, the private address may not be directly used by devices outside of the LON 302 to communicate with the local terminal device 308. In some embodiments, the private address may be an internet protocol (IP) address. However, embodiments of the invention are not limited to the use of IP addresses and where IP addresses are referred to herein, it will be appreciated that embodiments of the invention encompass the use of other addressing conventions as well. In some embodiments, the local terminal device 308 may be a mobile terminal 10.

The LON 302 may further include a plurality of P2PSIP peer nodes 310 (denoted "F*") comprising a P2PSIP network. The P2PSIP network may include a distributed database, such as a DHT, comprised of a plurality of private IP address data corresponding to devices on the LON 302, such as the local terminal device 308. The DHT may further comprise a plurality of public IP address data corresponding to devices on the LON 302. In this regard, each P2PSIP peer node 310 may maintain at least a portion of the address data using a distributed database protocol, such as, for example, DHT. Each P2PSIP node 310 may additionally have a public IP address such that a device on another network, such as the RON 306, that knows the public IP address of a P2PSIP node 310 may directly communicate with the P2PSIP node 310. A P2PSIP node 310 may be configured to instruct a network address translating (NAT) apparatus 316 to temporarily bind the private IP address of the local terminal device 308 to a public IP address so that a remote terminal device 318 (denoted "M") of the RON 306 may establish a communications session directly with the local terminal device 308 by addressing communications to the public IP address bound to the local terminal device's private IP address. In some embodiments, the remote terminal device 318 may be a mobile terminal 10. Additionally, in some embodiments the remote terminal device 318 may be a P2PSIP peer node residing in the RON 306.

Accordingly, a P2PSIP peer node 310 may be configured to control a radio access sub-network on which the local terminal device 308 is located. Further, a P2PSIP peer node 310 may be configured to make radio policy decisions based upon a status of the local terminal device 308 on the radio access sub-network. For example, a P2PSIP peer node 310 may handle requests from a remote terminal device 318 in accordance with radio policy based upon the status of the local terminal device 308. In this regard, a P2PSIP peer node 310 may, for example, delay or otherwise decide not to instruct a NAT apparatus 316 to bind the private IP address with a public IP address if the local terminal device 308 is busy or otherwise unavailable on the radio access sub-network. It will be appreciated that these are merely examples of policy decisions which a P2PSIP peer node 310 may make and it will be appreciated that a P2PSIP peer node 310 may make many additional policy decisions, such as based upon activity or availability details of the local terminal device 308. Accordingly, a P2PSIP peer node 310 may provide a single node that both controls the radio access sub-network that controls the local access terminal device 308 and controls the NAT apparatus 316.

The LON 302 may further include a P2PSIP enrollment server 312 (denoted "E*"), which may issue credentialing certificates to P2PSIP client and peer devices on the LON 302. Although referred to as a "server," embodiments of the invention are not so limited and the P2PSIP enrollment server 312 may be embodied as any computing device. The P2PSIP enrollment server 312 may also store and/or have access to domain name system (DNS) information. In this regard, the P2PSIP enrollment server 312 may receive a query from a remote terminal device 318 for the public IP address of a P2PSIP peer node 310. The P2PSIP enrollment server may randomly select a P2PSIP peer node 310 and look up its public IP address in the DNS and provide the public IP address to the remote terminal device 318. In some embodiments, the P2PSIP enrollment server 312 may be configured to select a P2PSIP peer node 310 based upon an algorithm or available usage information such that no one P2PSIP peer node 310 is disproportionately burdened with requests from remote terminal devices 318. In some embodiments, although not illustrated in FIG. 3, The LON 302 may further include a separate DNS server, which store and/or have access to domain name system (DNS) information. In this regard, the DNS server may receive a query from a remote terminal device 318 for the public IP address of a P2PSIP peer node 310. In some embodiments, the DNS server may be configured to select a P2PSIP peer node 310 based upon an algorithm or available usage information such that no one P2PSIP peer node 310 is disproportionately burdened with requests from remote terminal devices 318.

Figure 4:
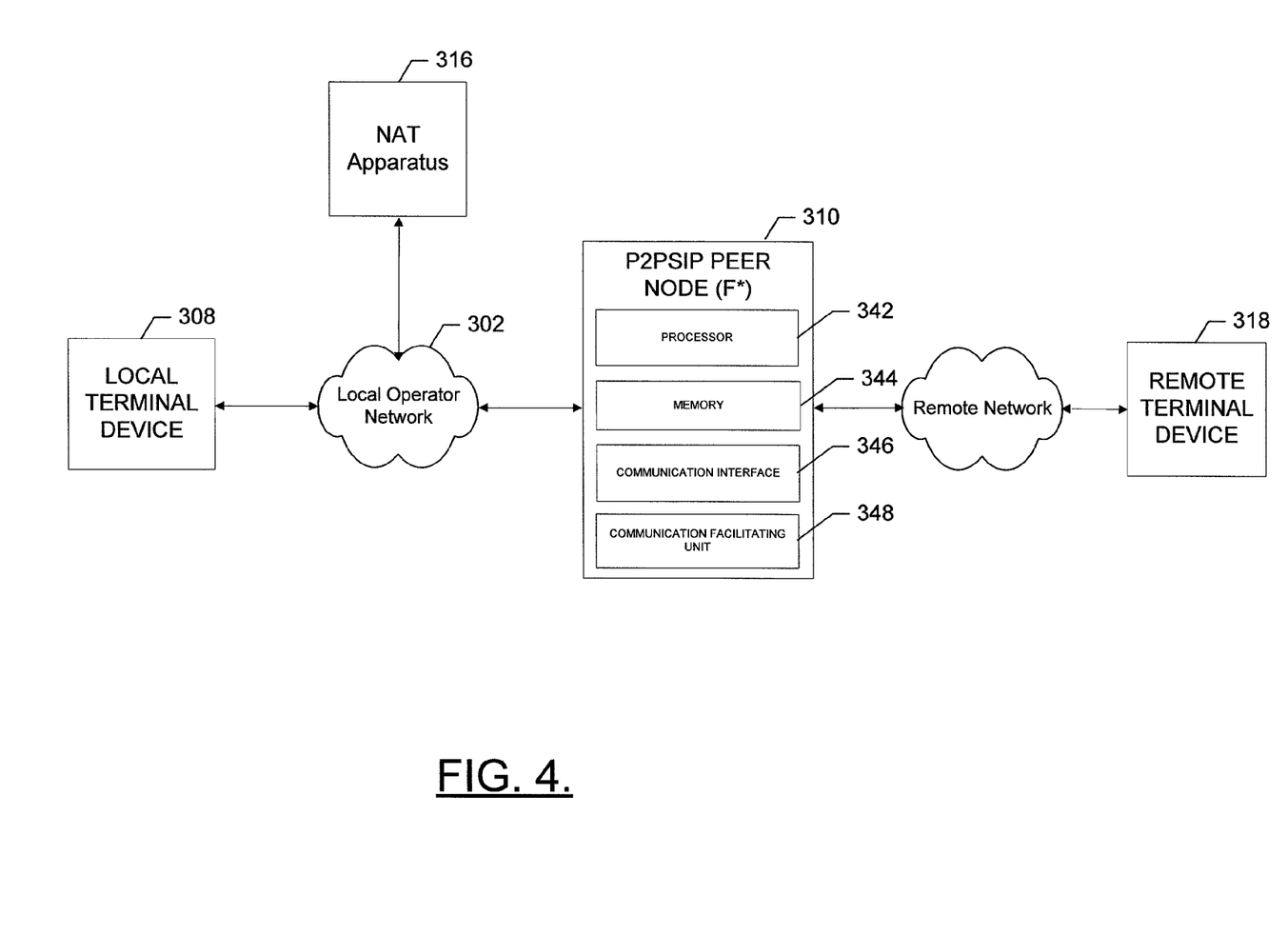
FIG. 4 illustrates a block diagram of a system for facilitating establishing a communications session using P2PSIP and DHT according to an example embodiment of the present invention.

FIG. 4 illustrates a block diagram of a system for facilitating establishing a communications session using P2PSIP and DHT according to an example embodiment of the present invention. The system of FIG. 4 may be regarded as another illustration of the system 300 of FIG. 3. In this regard, the system of FIG. 4 may include a local terminal device 308, P2PSIP peer node 310, NAT apparatus 316, and remote terminal device 318. Although only one instance of each of the local terminal device 308, P2PSIP peer node 310, NAT apparatus 316, and remote terminal device 318 is illustrated in FIG. 4, it will be appreciated that the system of FIG. 4 may include a plurality of each of the devices. The local terminal device 308, P2PSIP peer node 310, and NAT apparatus 316 may be part of and communicate via the LON 302. The P2PSIP peer node 310 and remote terminal device 318 may be part of separate networks and communicate over one or more remote networks, such as the public internet 304 and/or RON 306.

The P2PSIP peer node 310 may include various means, such as a processor 342, memory 344, communication interface 346, and communication facilitating unit 348 for performing the various functions herein described. The processor 342 may be embodied in a number of different ways. For example, the processor 342 may be embodied as a microprocessor, a coprocessor, a controller, or various other processing elements including integrated circuits such as, for example, an ASIC (application specific integrated circuit) or FPGA (field programmable gate array). In an example embodiment, the processor 342 may be configured to execute instructions stored in the memory 344 or otherwise accessible to the processor 342. Further, although illustrated in FIG. 4 as a single processor, the processor 342 may be embodied as a plurality of processors operating in parallel, which may be embodied on a single computing device or distributed across a plurality of computing devices, such as, for example, a server cluster.

The memory 344 may include, for example, volatile and/or non-volatile memory. The memory 344 may be configured to store information, data, applications, instructions, or the like for enabling the P2PSIP peer node 310 to carry out various functions in accordance with example embodiments of the present invention. For example, the memory 312 may be configured to buffer input data for processing by the processor 342. Additionally or alternatively, the memory 344 may be configured to store instructions for execution by the processor 342. As yet another alternative, the memory 344 may comprise one of a plurality of databases that store information in the form of static and/or dynamic information, for example, in association with mobile terminal context information, internet service context information, user status indicators, user activities, or the like. In this regard, the memory 344 may store, for example, at least a portion of a DHT comprising private address data for P2PSIP client devices, such as the local terminal device 308, on the LON 302. The private address data may be stored in association with one or more public identifiers associated with a local terminal device, such as, for example, an e-mail address or a uniform resource locator (URL). This stored information may be stored and/or used by the communication facilitating unit 348 during the course of performing its functionalities.

The communication interface 346 may be embodied as any device or means embodied in hardware, software, firmware, or a combination thereof that is configured to receive and/or transmit data from/to a network and/or any other device or module in communication with the P2PSIP peer node 310. The communication interface 346 may be at least partially embodied as or otherwise controlled by the processor 342. In this regard, the communication interface 346 may include, for example, an antenna, a transmitter, a receiver, a transceiver and/or supporting hardware or software for enabling communications with other entities of the system 300, such as a local terminal device 308, other P2PSIP peer nodes 310, a NAT apparatus 316, and a remote terminal device 318. In this regard, the communication interface 346 may be in communication with the memory 344 and/or communication facilitating unit 348. The communication interface 346 may provide an interface to the LON 302 as well as the RON 306. Accordingly, the communication interface 346 may provide means for sending and receiving requests, messages, and instructions to and from devices of the systems of FIGS. 3 and 4.

The communication facilitating unit 348 may be embodied as various means, such as hardware, software, firmware, or some combination thereof and, in one embodiment, may be embodied as or otherwise controlled by the processor 342. In embodiments where the communication facilitating unit 348 is embodied separately from the processor 342, the communication facilitating unit 348 may be in communication with the processor 342. The communication facilitating unit 348 may be configured to control a radio access sub-network on which the local terminal device 308 is located and make radio policy decisions based upon a status of the local terminal device 308 on the radio access sub-network as discussed above. Additionally, the communication facilitating unit 348 may be configured to maintain at least a portion of a DHT, which may be stored, for example in memory 344. In this regard, in some embodiments, the communication facilitating unit 348 may be configured to store public or private addresses in the DHT and otherwise update the DHT as necessary. The communication facilitating unit 348 may be further configured to extract an indication of a local terminal device 308, such as, for example, a URL or e-mail address, from a query request message sent to the P2PSIP peer node 310 by the remote terminal device 318 seeking to establish a communications session with the local terminal device 308. The communication facilitating unit 348 may be configured to use the extracted indication of the local terminal device 308 to search the DHT for an address of the local terminal device 308. In this regard, the communication facilitating unit 348 may be configured to search both a portion of the DHT stored locally to the P2PSIP peer node 310 as well as portions of the DHT stored remotely on other P2PSIP peer nodes comprising the PTPSIP network.

If the DHT includes a public address for the local terminal device 308, the communication facilitating unit 348 may be configured to simply provide that public address to the remote terminal device 318. If, however, the DHT includes only a private address for the local terminal device 308, the communication facilitating unit 348 may additionally be configured to instruct the NAT apparatus 316 to create a temporary binding between the private address for the local terminal device 308 and a public address accessible by the remote terminal device 318. The communication facilitating unit 348 may be configured to receive the public address to which the private address is bound from the NAT apparatus 316. Upon receipt of the public address from the NAT apparatus 316, the communication facilitating unit 348 may be configured to facilitate establishing a communications session, such as a VoIP session, between the local terminal device 308 and the remote terminal device 318. In this regard, the communication facilitating unit 348 may be configured, for example, to provide the public address to the remote terminal device 318 such that the remote terminal device 318 may use the public address to establish a communications session with the local terminal device 308.

Figure 5:
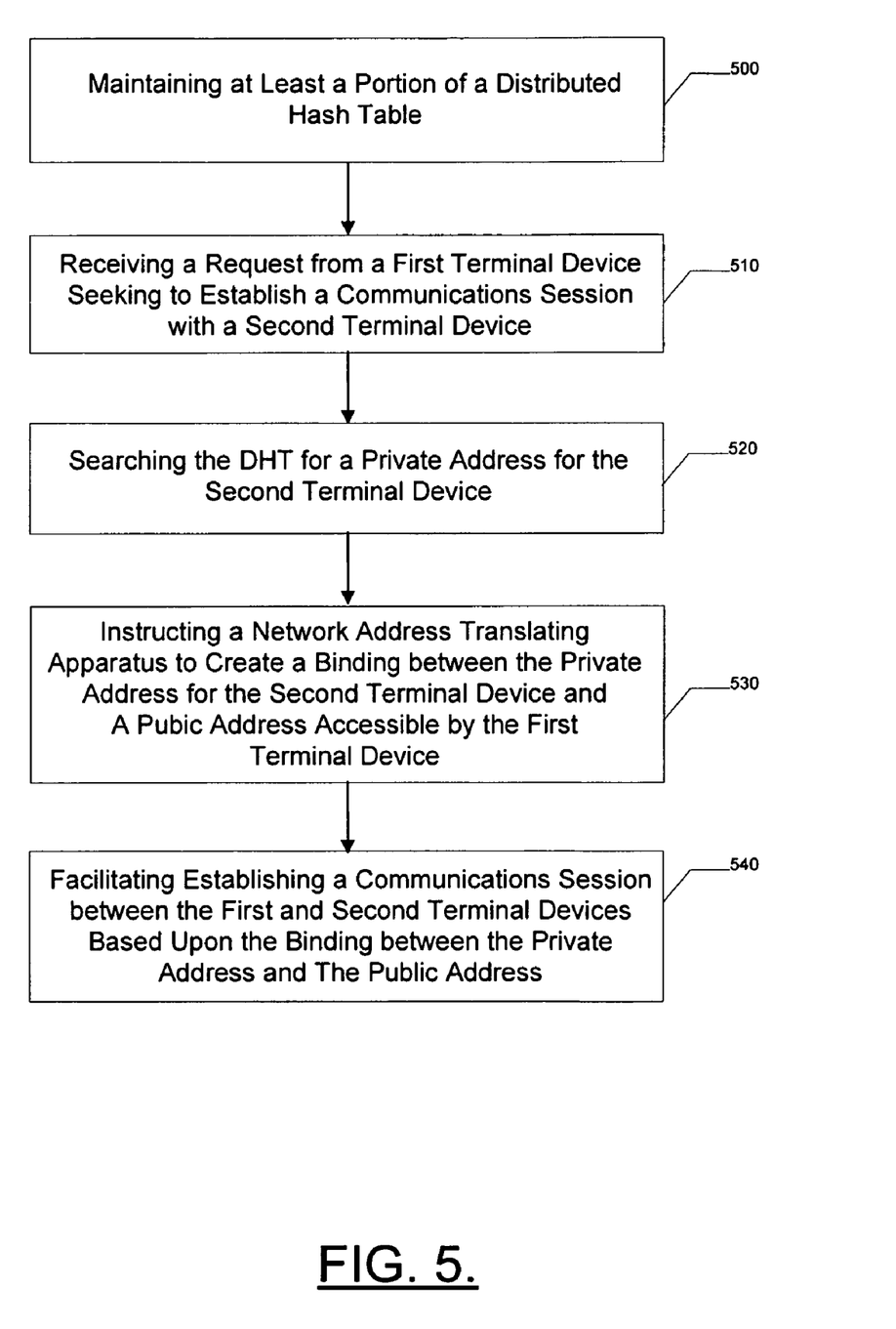
FIG. 5 is a flowchart according to an example method for facilitating establishing a communications session using P2PSIP and DHT according to an example embodiment of the present invention.

FIG. 5 is a flowchart of a system, method, and computer program product according to an example embodiment of the invention. It will be understood that each block or step of the flowchart, and combinations of blocks in the flowchart, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal, server, or other computing device and executed by a built-in processor in the computing device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, may be implemented by special purpose hardware-based computer systems which perform the specified functions or steps, or combinations of special purpose hardware and computer instructions.

In this regard, one example method for facilitating establishing a communications session using P2PSIP and DHT according to an example embodiment of the present invention is illustrated in FIG. 5. The method may include a P2PSIP Peer Node 310 maintaining at least a portion of a distributed hash table comprising private address data for P2PSIP client nodes at operation 500. In this regard, for example, the communication facilitating unit 348 may maintain at least a portion of the DHT on memory 344. Operation 510 may comprise the communication interface 346 receiving a request from a first terminal device, such as a remote terminal device 318, seeking to establish a communications session with a second terminal device, such as a local terminal device 308. The communication facilitating unit 348 may then search the DHT for a private address for the second terminal device at operation 520. Operation 530 may comprise the communication facilitating unit 348 instructing a NAT apparatus 316, such as via the communication interface 346, to create a binding between the private address for the second terminal device and a public address accessible by the first terminal device. The communication facilitating unit 348 may then facilitate establishing a communications session between the first and second terminal devices based upon the binding between the private address and public address at operation 540. In this regard, for example, the communication facilitating unit 348 may send a message comprising the public address to the first terminal device, such as via the communication interface 346, so that the first device may establish a communication session using the public address.

The above described functions may be carried out in many ways. For example, any suitable means for carrying out each of the functions described above may be employed to carry out embodiments of the invention. In one embodiment, all or a portion of the elements generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention may provide several advantages to a user of a computing device, such as a mobile terminal 10. Embodiments of the invention may provide for enhancing the establishment of communications sessions between a remote terminal device residing on a remote network and a local terminal device residing on a local operator network facilitating establishing a communications session using P2PSIP and DHT. In this regard, P2PSIP nodes may be assigned public addresses accessible by the remote terminal device and be configured to retrieve the local terminal device's private address in response to a query from the remote terminal device, initiate the binding of the private address to a public address at the NAT, and facilitate communication between the remote terminal device and the local terminal device, such as by providing the bound public address to the remote terminal device so that the remote terminal device may directly communicate with the local terminal device. Accordingly, embodiments of the invention may provide several advantages over prior art systems in that a P2PSIP peer node maintaining at least a portion of the DHT directly receives an address query from a remote terminal device and directly controls the NAT apparatus without requiring an intermediary proxy device. Further in at least some embodiments of the invention, a P2PSIP peer node may control both a radio access sub-network on which the local terminal device is located and control the NAT apparatus. Accordingly, a P2PSIP peer node may make radio policy decisions, such as based upon a status of the local terminal device on the radio access sub-network. In this regard, embodiments of the invention may reduce delays and bottlenecks that may occur in systems using proxy devices as intermediaries between remote terminal devices 318 and P2PSIP peer nodes.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   maintaining, at a distributed database peer node, at least a portion of a distributed database, wherein the distributed database comprises private address data;
   receiving, at the distributed database peer node, a request from a first terminal device seeking to establish a communications session with a second terminal device;
   searching, by the distributed database peer node, the distributed database for a private address for the second terminal device;
   causing the distributed database peer node to instruct a network address translating (NAT) apparatus to create a binding between the private address for the second terminal device and a public address accessible by the first terminal device; and
   causing the distributed database peer node to control a radio access sub-network on which the second terminal device is located.

2. A method according to claim 1, further comprising making radio policy decisions based at least in part upon a status of the second terminal device on the radio access sub-network.

3. A method according to claim 1, further comprising facilitating establishing a communications session between the first and second terminal devices based at least in part upon the binding between the private address and the public address.

4. A method according to claim 3, further comprising:
   receiving the public address from the NAT apparatus; and
   wherein facilitating establishing a communications session between the first and second terminal devices comprises causing the public address to be provided to the first terminal device.

5. A method according to claim 1, wherein the distributed database comprises a plurality of private internet protocol (IP) addresses and wherein causing the distributed database peer node to instruct the NAT apparatus to create a binding between the private address for the second terminal device and a public address comprises causing the distributed database peer node to instruct the NAT apparatus to create a binding between a private IP address for the second terminal device and a public IP address.

6. A method according to claim 5, further comprising facilitating establishing a voice over internet protocol (VoIP) communications session between the first and second terminal devices.

7. A method according to claim 5, wherein the distributed database peer node comprises a peer-to-peer session initiation protocol (P2PSIP) peer node, and wherein the received request is addressed to a public IP address corresponding to the P2PSIP peer node.

8. A computer program product comprising at least one non-transitory computer-readable storage medium having computer-readable program code portions stored therein, the computer-readable program code portions comprising:
   a program code portion configured to maintain at least a portion of a distributed database, wherein the distributed database comprises private address data;
   a program code portion configured to cause receipt of a request from a first terminal device seeking to establish a communications session with a second terminal device;
   a program code portion configured to search the distributed database for a private address for the second terminal device;
   a program code portion configured to cause a network address translating (NAT) apparatus to be instructed to create a binding between the private address for the second terminal device and a public address accessible by the first terminal device; and
   a program code portion configured to control a radio access sub-network on which the second terminal device is located.

9. A computer program product according to claim 8, further comprising:
   a program code portion configured to make radio policy decisions based at least in part upon a status of the second terminal device on the radio access sub-network.

10. A computer program product according to claim 8, further comprising:
   a program code portion configured to facilitate establishing a communications session between the first and second terminal devices based at least in part upon the binding between the private address and the public address.

11. A computer program product according to claim 10, further comprising:
   a program code portion configured to cause receipt of the public address from the NAT apparatus; and
   wherein the program code portion configured to facilitate establishing a communications session includes instructions configured to cause the public address to be provided to the first terminal device.

12. A computer program product according to claim 8, wherein the distributed database comprises a plurality of private internet protocol (IP) addresses and wherein the program code portion configured to cause the NAT apparatus to be instructed to create a binding between the private address for the second terminal device and a public address comprises a program code portion configured to cause the NAT apparatus to be instructed to create a binding between a private IP address for the second terminal device and a public IP address.

13. A computer program product according to claim 12, further comprising:
   a program code portion configured to facilitate establishing a voice over internet protocol (VoIP) communications session between the first and second terminal devices.

14. An apparatus comprising at least one processor and at least one memory storing computer program code, wherein the at least one memory and stored computer program code are configured, with the at least one processor, to cause the apparatus to at least:
   maintain at least a portion of a distributed database, wherein the distributed database comprises private address data;
   receive a request from a first terminal device seeking to establish a communications session with a second terminal device;
   search the distributed database in the memory for a private address for the second terminal device;
   cause a network address translating (NAT) apparatus to be instructed to create a binding between the private address for the second terminal device and a public address accessible by the first terminal device; and
   control a radio access sub-network on which the second terminal device is located.

15. An apparatus according to claim 14, wherein the at least one memory and stored computer program code are configured, with the at least one processor, to further cause the apparatus to make radio policy decisions based at least in part upon a status of the second terminal device on the radio access sub-network.

16. An apparatus according to claim 14, wherein the at least one memory and stored computer program code are configured, with the at least one processor, to further cause the apparatus to facilitate establishing a communications session between the first and second terminal devices based at least in part upon the binding between the private address and the public address.

17. An apparatus according to claim 14, wherein the at least one memory and stored computer program code are configured, with the at least one processor, to further cause the apparatus to:
   receive the public address from the NAT apparatus; and
   facilitate establishing a communications session between the first and second terminal devices by causing the public address to be provided to the first terminal device.

18. An apparatus according to claim 14, wherein the distributed database comprises a plurality of private interne protocol (IP) addresses and wherein the at least one memory and stored computer program code are configured, with the at least one processor, to further cause the apparatus to cause the NAT apparatus to be instructed to create a binding between a private IP address for the second terminal device and a public IP address.

19. An apparatus according to claim 18, wherein the at least one memory and stored computer program code are configured, with the at least one processor, to further cause the apparatus to facilitate establishing a voice over interne protocol (VoIP) communications session between the first and second devices.

20. An apparatus according to claim 18, wherein the at least one memory and stored computer program code are configured, with the at least one processor, to further cause the apparatus to receive a request at a peer-to-peer session initiation protocol (P2PSIP) peer node, wherein the request is addressed to a public IP address corresponding to the P2PSIP peer node.

21. An apparatus comprising:
means for maintaining at least a portion of a distributed database, wherein the distributed database comprises private address data;
means for receiving a request from a first terminal device seeking to establish a communications session with a second terminal device;
means for searching the distributed database for a private address for the second terminal device;
means for causing a network address translating (NAT) apparatus to be instructed to create a binding between the private address for the second terminal device and a public address accessible by the first terminal device; and
means for controlling a radio access sub-network on which the second terminal device is located.

22. A method according to claim 1, wherein searching the distributed database comprises using a processor to search the distributed database.

23. A method according to claim 1, wherein the distributed database peer node has a public address enabling the first terminal to contact the distributed database peer node.

24. A method according to claim 1, further comprising:
searching, by the distributed database peer node, the distributed database for a public address for the second terminal device;
wherein causing the distributed database peer node to instruct a network address translating apparatus to create a binding comprises causing the distributed database peer node to instruct the network address translating apparatus to create a binding only in an instance in which the distributed database does not include a public address for the second terminal device.

25. A method according to claim 24, wherein in an instance in which the distributed database does contain a public address for the second terminal device, the method further comprises causing the distributed database peer node to provide the public address to the first terminal device.

* * * * *

UNITED STATES PATENT AND TRADEMARK OFFICE
CERTIFICATE OF CORRECTION

PATENT NO. : 8,239,550 B2  
APPLICATION NO. : 12/152376  
DATED : August 7, 2012  
INVENTOR(S) : Matuszewski Page 1 of 1

It is certified that error appears in the above-identified patent and that said Letters Patent is hereby corrected as shown below:

Column 16,
Lines 48 and 58, "interne" should read --internet--.

Signed and Sealed this
Nineteenth Day of March, 2013

Teresa Stanek Rea
*Acting Director of the United States Patent and Trademark Office*